(12) United States Patent
Haeberle et al.

(10) Patent No.: US 8,380,549 B2
(45) Date of Patent: Feb. 19, 2013

(54) ARCHITECTURAL DESIGN FOR EMBEDDED SUPPORT APPLICATION SOFTWARE

(75) Inventors: Tilmann Haeberle, Wiesloch (DE); Berthold Wocher, Gaiberg (DE)

(73) Assignee: SAP AG, Walldorf (DE)

( * ) Notice: Subject to any disclaimer, the term of this patent is extended or adjusted under 35 U.S.C. 154(b) by 951 days.

(21) Appl. No.: 12/233,087

(22) Filed: Sep. 18, 2008

(65) Prior Publication Data

US 2010/0070289 A1 Mar. 18, 2010

(51) Int. Cl.
*G06F 17/50* (2006.01)
*G06F 9/44* (2006.01)
*G06Q 10/00* (2006.01)
(52) U.S. Cl. ............................................. 705/7; 705/28
(58) Field of Classification Search .................. 705/7.11, 705/28
See application file for complete search history.

(56) References Cited

U.S. PATENT DOCUMENTS

| | | | |
|---|---|---|---|
| 4,947,321 A | | 8/1990 | Spence et al. |
| 5,361,198 A | | 11/1994 | Harmon et al. |
| 5,488,713 A | * | 1/1996 | Norton et al. .................. 703/22 |
| 5,535,322 A | * | 7/1996 | Hecht ........................... 705/301 |
| 5,550,734 A | | 8/1996 | Tarter et al. |
| 5,560,005 A | | 9/1996 | Hoover et al. |
| 5,566,097 A | * | 10/1996 | Myers et al. ..................... 703/15 |
| 5,572,727 A | * | 11/1996 | Larsson et al. ........................ 1/1 |
| 5,577,261 A | * | 11/1996 | Harinarayan et al. ........ 718/102 |
| 5,586,312 A | | 12/1996 | Johnson et al. |
| 5,590,277 A | * | 12/1996 | Fuchs et al. ................. 714/38.13 |
| 5,632,022 A | | 5/1997 | Warran et al. |
| 5,634,127 A | | 5/1997 | Cloud et al. |
| 5,680,619 A | | 10/1997 | Gudmundson et al. |
| 5,682,473 A | * | 10/1997 | Carson et al. ................. 714/38.1 |
| 5,704,044 A | | 12/1997 | Tarter et al. |
| 5,710,917 A | | 1/1998 | Musa et al. |
| 5,768,119 A | | 6/1998 | Havekost et al. |
| 5,822,585 A | | 10/1998 | Noble et al. |
| 5,832,218 A | | 11/1998 | Gibbs et al. |

(Continued)

FOREIGN PATENT DOCUMENTS

| | | |
|---|---|---|
| WO | 00/23874 | 4/2000 |
| WO | WO 2004/083984 | 9/2004 |

(Continued)

OTHER PUBLICATIONS

Data mining navy flight ; Meseroll Robert, IEEE Autotestcom 2007, 476-81, Sep. 2007.*

(Continued)

*Primary Examiner* — Matthew Gart
*Assistant Examiner* — Harshad Parikh
(74) *Attorney, Agent, or Firm* — Fish & Richardson P.C.

(57) ABSTRACT

Methods, systems, and apparatus, including computer program products, for implementing a software architecture design for a software application implementing embedded support. The application is structured as multiple process components interacting with each other through service interfaces, and multiple service operations, each being implemented for a respective process component. The process components include, for example, a Support Request Processing process component that handles a request reflecting the initial inquiry to clarify and solve an incident during the operations of an IT system and a Software Problem Reporting process component that handles the collection and reporting of context data in the IT system.

18 Claims, 6 Drawing Sheets

U.S. PATENT DOCUMENTS

| | | | |
|---|---|---|---|
| 5,848,291 A | 12/1998 | Milne et al. | |
| 5,867,495 A | 2/1999 | Elliott et al. | |
| 5,870,588 A * | 2/1999 | Rompaey et al. | 703/13 |
| 5,881,230 A | 3/1999 | Christensen et al. | |
| 5,893,106 A | 4/1999 | Brobst et al. | |
| 5,894,571 A * | 4/1999 | O'Connor | 713/2 |
| 5,898,872 A * | 4/1999 | Richley | 717/121 |
| 5,918,219 A | 6/1999 | Isherwood | |
| 5,987,247 A | 11/1999 | Lau | |
| 5,991,536 A | 11/1999 | Brodsky et al. | |
| H001830 H | 1/2000 | Petrimoulx et al. | |
| 6,028,997 A | 2/2000 | Leymann et al. | |
| 6,038,393 A * | 3/2000 | Iyengar et al. | 717/104 |
| 6,049,838 A | 4/2000 | Miller et al. | |
| 6,067,559 A * | 5/2000 | Allard et al. | 709/202 |
| 6,070,197 A | 5/2000 | Cobb et al. | |
| 6,112,024 A | 8/2000 | Almond et al. | |
| 6,151,582 A | 11/2000 | Huang et al. | |
| 6,167,563 A | 12/2000 | Fontana et al. | |
| 6,167,564 A | 12/2000 | Fontana et al. | |
| 6,177,932 B1 * | 1/2001 | Galdes et al. | 715/733 |
| 6,182,133 B1 | 1/2001 | Horvitz | |
| 6,192,390 B1 * | 2/2001 | Berger et al. | 709/200 |
| 6,195,676 B1 * | 2/2001 | Spix et al. | 718/107 |
| 6,202,044 B1 * | 3/2001 | Tzori | 703/28 |
| 6,208,345 B1 | 3/2001 | Sheard et al. | |
| 6,237,136 B1 * | 5/2001 | Sadahiro | 717/110 |
| 6,272,672 B1 | 8/2001 | Conway | |
| 6,311,170 B1 | 10/2001 | Embrey | |
| 6,338,097 B1 | 1/2002 | Krenzke et al. | |
| 6,424,991 B1 | 7/2002 | Gish | |
| 6,434,740 B1 | 8/2002 | Monday et al. | |
| 6,442,748 B1 | 8/2002 | Bowman-Amuah | |
| 6,445,782 B1 | 9/2002 | Elfe et al. | |
| 6,446,045 B1 | 9/2002 | Stone et al. | |
| 6,446,092 B1 | 9/2002 | Sutter | |
| 6,473,794 B1 | 10/2002 | Guheen et al. | |
| 6,493,716 B1 | 12/2002 | Azagury et al. | |
| 6,571,220 B1 | 5/2003 | Ogino et al. | |
| 6,594,535 B1 | 7/2003 | Costanza | |
| 6,601,233 B1 * | 7/2003 | Underwood | 717/102 |
| 6,601,234 B1 | 7/2003 | Bowman-Amuah | |
| 6,606,744 B1 | 8/2003 | Mikurak | |
| 6,609,100 B2 | 8/2003 | Smith et al. | |
| 6,640,238 B1 * | 10/2003 | Bowman-Amuah | 709/201 |
| 6,671,673 B1 | 12/2003 | Baseman et al. | |
| 6,678,882 B1 | 1/2004 | Hurley et al. | |
| 6,687,734 B1 | 2/2004 | Sellink et al. | |
| 6,691,151 B1 | 2/2004 | Cheyer et al. | |
| 6,721,783 B1 | 4/2004 | Blossman et al. | |
| 6,738,964 B1 | 5/2004 | Zink et al. | |
| 6,747,679 B1 | 6/2004 | Finch et al. | |
| 6,750,885 B1 | 6/2004 | Finch et al. | |
| 6,757,837 B1 * | 6/2004 | Platt et al. | 714/38.13 |
| 6,764,009 B2 | 7/2004 | Melick et al. | |
| 6,772,216 B1 | 8/2004 | Ankireddipally et al. | |
| 6,782,536 B2 | 8/2004 | Moore et al. | |
| 6,789,252 B1 | 9/2004 | Burke et al. | |
| 6,845,499 B2 | 1/2005 | Srivastava et al. | |
| 6,847,854 B2 | 1/2005 | Discenzo | |
| 6,859,931 B1 | 2/2005 | Cheyer et al. | |
| 6,889,197 B2 | 5/2005 | Lidow | |
| 6,889,375 B1 | 5/2005 | Chan et al. | |
| 6,895,438 B1 | 5/2005 | Ulrich | |
| 6,898,783 B1 | 5/2005 | Gupta et al. | |
| 6,904,399 B2 | 6/2005 | Cooper et al. | |
| 6,907,395 B1 | 6/2005 | Hunt et al. | |
| 6,954,736 B2 | 10/2005 | Menninger et al. | |
| 6,985,939 B2 | 1/2006 | Fletcher et al. | |
| 6,990,466 B1 | 1/2006 | Hu | |
| 7,003,474 B2 | 2/2006 | Lidow | |
| 7,031,998 B2 | 4/2006 | Archbold | |
| 7,043,448 B2 | 5/2006 | Campbell | |
| 7,047,518 B2 | 5/2006 | Little et al. | |
| 7,050,056 B2 | 5/2006 | Meyringer | |
| 7,050,873 B1 | 5/2006 | Discenzo | |
| 7,055,136 B2 | 5/2006 | Dzoba et al. | |
| 7,058,587 B1 | 6/2006 | Horne | |
| 7,069,536 B2 | 6/2006 | Yaung | |
| 7,072,855 B1 | 7/2006 | Godlewski et al. | |
| 7,076,766 B2 | 7/2006 | Wirts et al. | |
| 7,100,195 B1 * | 8/2006 | Underwood | 726/2 |
| 7,103,873 B2 | 9/2006 | Tanner et al. | |
| 7,117,447 B2 | 10/2006 | Cobb et al. | |
| 7,120,597 B1 | 10/2006 | Knudtzon et al. | |
| 7,120,896 B2 | 10/2006 | Budhiraja et al. | |
| 7,131,069 B1 | 10/2006 | Rush et al. | |
| 7,149,887 B2 * | 12/2006 | Morrison et al. | 713/1 |
| 7,155,403 B2 * | 12/2006 | Cirulli et al. | 705/17 |
| 7,155,409 B1 | 12/2006 | Stroh | |
| 7,181,694 B2 | 2/2007 | Reiss et al. | |
| 7,184,964 B2 | 2/2007 | Wang | |
| 7,194,431 B1 | 3/2007 | Land et al. | |
| 7,197,740 B2 | 3/2007 | Beringer et al. | |
| 7,200,569 B2 | 4/2007 | Gallagher et al. | |
| 7,206,768 B1 | 4/2007 | deGroeve et al. | |
| 7,213,232 B1 | 5/2007 | Knowles | |
| 7,216,091 B1 | 5/2007 | Blandina et al. | |
| 7,219,107 B2 | 5/2007 | Beringer | |
| 7,222,786 B2 | 5/2007 | Renz et al. | |
| 7,225,240 B1 | 5/2007 | Fox et al. | |
| 7,249,044 B2 | 7/2007 | Kumar et al. | |
| 7,257,254 B2 | 8/2007 | Tunney | |
| 7,283,973 B1 | 10/2007 | Loghmani et al. | |
| 7,293,254 B2 | 11/2007 | Bloesch et al. | |
| 7,299,970 B1 | 11/2007 | Ching | |
| 7,315,830 B1 | 1/2008 | Wirtz et al. | |
| 7,322,024 B2 | 1/2008 | Carlson et al. | |
| 7,324,966 B2 | 1/2008 | Scheer | |
| 7,353,180 B1 | 4/2008 | Silverstone et al. | |
| 7,356,492 B2 | 4/2008 | Hazi et al. | |
| 7,367,011 B2 | 4/2008 | Ramsey et al. | |
| 7,370,315 B1 | 5/2008 | Lovell et al. | |
| 7,376,601 B1 | 5/2008 | Aldridge | |
| 7,376,604 B1 | 5/2008 | Butcher | |
| 7,376,632 B1 | 5/2008 | Sadek et al. | |
| 7,383,201 B2 | 6/2008 | Matsuzaki et al. | |
| 7,386,833 B2 | 6/2008 | Granny et al. | |
| 7,406,716 B2 | 7/2008 | Kanamori et al. | |
| 7,412,626 B2 * | 8/2008 | Wood et al. | 714/38.1 |
| 7,415,697 B1 | 8/2008 | Houlding | |
| 7,418,409 B1 | 8/2008 | Goel | |
| 7,418,424 B2 | 8/2008 | Martin et al. | |
| 7,424,701 B2 * | 9/2008 | Kendall et al. | 717/105 |
| 7,433,979 B2 | 10/2008 | Need | |
| 7,448,022 B1 | 11/2008 | Ram et al. | |
| 7,451,432 B2 | 11/2008 | Shukla et al. | |
| 7,460,654 B1 | 12/2008 | Jenkins et al. | |
| 7,461,030 B2 | 12/2008 | Hibler et al. | |
| 7,469,233 B2 | 12/2008 | Shooks et al. | |
| 7,496,920 B1 * | 2/2009 | Bandhole et al. | 718/104 |
| 7,516,088 B2 * | 4/2009 | Johnson et al. | 705/16 |
| 7,523,054 B2 | 4/2009 | Tyson-Quah | |
| 7,529,699 B2 | 5/2009 | Fuse et al. | |
| 7,530,065 B1 * | 5/2009 | Ciudad et al. | 717/174 |
| 7,536,325 B2 | 5/2009 | Randell et al. | |
| 7,536,354 B1 | 5/2009 | deGroeve et al. | |
| 7,546,520 B2 | 6/2009 | Davidson et al. | |
| 7,546,575 B1 | 6/2009 | Dillman et al. | |
| 7,565,640 B2 | 7/2009 | Shukla et al. | |
| 7,574,694 B2 | 8/2009 | Mangan et al. | |
| 7,577,953 B1 * | 8/2009 | Verego et al. | 718/100 |
| 7,610,575 B2 * | 10/2009 | Sproule | 717/103 |
| 7,624,338 B2 * | 11/2009 | Opitz et al. | 715/209 |
| 7,624,371 B2 | 11/2009 | Kulkarni et al. | |
| 7,631,291 B2 | 12/2009 | Shukla et al. | |
| 7,640,195 B2 | 12/2009 | Von Zimmermann et al. | |
| 7,640,291 B2 | 12/2009 | Maturana et al. | |
| 7,644,065 B2 * | 1/2010 | Wu et al. | 707/999.003 |
| 7,644,390 B2 | 1/2010 | Khodabandehloo et al. | |
| 7,657,406 B2 | 2/2010 | Tolone et al. | |
| 7,657,445 B1 | 2/2010 | Goux | |
| 7,665,083 B2 | 2/2010 | Demant et al. | |
| 7,668,761 B2 | 2/2010 | Jenkins et al. | |
| 7,672,888 B2 | 3/2010 | Allin et al. | |
| 7,681,176 B2 | 3/2010 | Wills et al. | |
| 7,693,586 B2 | 4/2010 | Dumas et al. | |

| Patent/Pub No. | Date | Inventor |
|---|---|---|
| 7,703,073 B2 | 4/2010 | Illowsky et al. |
| 7,716,316 B2 * | 5/2010 | Nichols et al. ............... 709/223 |
| 7,739,160 B1 | 6/2010 | Ryan et al. |
| 7,742,985 B1 | 6/2010 | Digrigoli et al. |
| 7,747,980 B2 | 6/2010 | Illowsky et al. |
| 7,761,288 B2 * | 7/2010 | Parnell et al. ..................... 704/2 |
| 7,765,156 B2 | 7/2010 | Staniar et al. |
| 7,765,521 B2 | 7/2010 | Bryant |
| 7,778,720 B2 * | 8/2010 | Alse .............. 700/103 |
| 7,788,145 B2 | 8/2010 | Wadawadigi et al. |
| 7,788,319 B2 | 8/2010 | Schmidt |
| 7,793,256 B2 * | 9/2010 | Charisius et al. ............. 717/103 |
| 7,793,258 B2 * | 9/2010 | Sundararajan et al. ....... 717/109 |
| 7,797,698 B2 | 9/2010 | Diament et al. |
| 7,814,142 B2 | 10/2010 | Mamou et al. |
| 7,822,682 B2 | 10/2010 | Arnold et al. |
| 7,827,154 B1 * | 11/2010 | Spertus et al. ................. 707/689 |
| 7,835,971 B2 | 11/2010 | Stockton et al. |
| 7,886,041 B2 * | 2/2011 | Outhred et al. ............... 709/224 |
| 7,895,568 B1 | 2/2011 | Goodwin et al. |
| 7,904,350 B2 | 3/2011 | Ayala et al. |
| 7,912,755 B2 * | 3/2011 | Perry et al. .................. 705/26.61 |
| 7,917,889 B2 | 3/2011 | Devarakonda et al. |
| 7,925,985 B2 | 4/2011 | Moore |
| 7,954,091 B2 * | 5/2011 | Li et al. ......................... 717/135 |
| 7,962,436 B2 * | 6/2011 | Brelage et al. .................. 706/47 |
| 7,975,179 B2 * | 7/2011 | Chandrasekaran ........ 714/38.1 |
| 7,975,265 B2 * | 7/2011 | Schnoebelen et al. ........ 717/174 |
| 7,987,087 B2 * | 7/2011 | Rich ..................... 704/2 |
| 8,001,519 B2 * | 8/2011 | Conallen et al. ............. 717/105 |
| 8,010,938 B2 * | 8/2011 | Elaasar ......... 717/104 |
| 8,015,541 B1 * | 9/2011 | Srinivasan et al. ........... 717/104 |
| 8,051,332 B2 | 11/2011 | Zakonov et al. |
| 8,065,315 B2 * | 11/2011 | Rapp et al. ................... 707/759 |
| 8,091,065 B2 | 1/2012 | Mir et al. |
| 8,112,738 B2 | 2/2012 | Pohl et al. |
| 8,112,747 B2 * | 2/2012 | Haeberle et al. .............. 717/172 |
| 8,132,166 B2 * | 3/2012 | DeHaan ........ 717/177 |
| 2001/0052108 A1 * | 12/2001 | Bowman-Amuah .............. 717/1 |
| 2002/0026394 A1 | 2/2002 | Savage et al. |
| 2002/0042756 A1 * | 4/2002 | Kumar et al. .................. 705/26 |
| 2002/0049622 A1 | 4/2002 | Lettich et al. |
| 2002/0073114 A1 | 6/2002 | Nicastro et al. |
| 2002/0078046 A1 * | 6/2002 | Uluakar et al. .................... 707/8 |
| 2002/0082892 A1 | 6/2002 | Raffel et al. |
| 2002/0103660 A1 | 8/2002 | Cramon et al. |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0058277 A1 * | 3/2003 | Bowman-Amuah .......... 345/765 |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0054564 A1 * | 3/2004 | Fonseca et al. ................... 705/7 |
| 2004/0093268 A1 | 5/2004 | Ramchandani et al. |
| 2004/0093381 A1 * | 5/2004 | Hodges et al. ................ 709/204 |
| 2004/0111304 A1 | 6/2004 | Meka et al. |
| 2004/0111639 A1 | 6/2004 | Schwartz et al. |
| 2004/0128180 A1 | 7/2004 | Abel et al. |
| 2004/0133481 A1 | 7/2004 | Schwarze et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0216507 A1 * | 9/2005 | Wright ....................... 707/104.1 |
| 2005/0222896 A1 | 10/2005 | Rhyne et al. |
| 2005/0234787 A1 * | 10/2005 | Wallmeier et al. .............. 705/30 |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0262453 A1 | 11/2005 | Massasso |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0149574 A1 * | 7/2006 | Bradley et al. ..................... 705/1 |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0022410 A1 * | 1/2007 | Ban et al. ....................... 717/136 |
| 2007/0050308 A1 * | 3/2007 | Latvala et al. .................. 705/80 |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |

| | | | |
|---|---|---|---|
| 2007/0150387 A1 | 6/2007 | Seubert et al. | |
| 2007/0150855 A1 | 6/2007 | Jeong | |
| 2007/0156428 A1* | 7/2007 | Brecht-Tillinger et al. | 705/1 |
| 2007/0156430 A1 | 7/2007 | Kaetker et al. | |
| 2007/0156474 A1* | 7/2007 | Scherberger et al. | 705/7 |
| 2007/0156475 A1 | 7/2007 | Berger et al. | |
| 2007/0156476 A1* | 7/2007 | Koegler et al. | 705/7 |
| 2007/0156482 A1 | 7/2007 | Bagheri | |
| 2007/0156489 A1* | 7/2007 | Berger et al. | 705/8 |
| 2007/0156493 A1 | 7/2007 | Tebbe et al. | |
| 2007/0156499 A1* | 7/2007 | Berger et al. | 705/9 |
| 2007/0156500 A1 | 7/2007 | Merkel et al. | |
| 2007/0156538 A1 | 7/2007 | Peter et al. | |
| 2007/0156550 A1 | 7/2007 | Der Emde et al. | |
| 2007/0156731 A1 | 7/2007 | Ben-Zeev | |
| 2007/0162893 A1 | 7/2007 | Kaetker et al. | |
| 2007/0164849 A1* | 7/2007 | Haeberle et al. | 340/7.23 |
| 2007/0168303 A1 | 7/2007 | Kaetker et al. | |
| 2007/0174068 A1 | 7/2007 | Alfandary et al. | |
| 2007/0174145 A1 | 7/2007 | Hetzer et al. | |
| 2007/0174811 A1 | 7/2007 | Kaetker et al. | |
| 2007/0186209 A1 | 8/2007 | Kaetker et al. | |
| 2007/0197877 A1 | 8/2007 | Decorte et al. | |
| 2007/0198391 A1 | 8/2007 | Dreyer et al. | |
| 2007/0214065 A1 | 9/2007 | Kahlon et al. | |
| 2007/0220046 A1* | 9/2007 | Moosmann et al. | 707/104.1 |
| 2007/0220143 A1* | 9/2007 | Lund et al. | 709/224 |
| 2007/0233539 A1 | 10/2007 | Suenderhauf et al. | |
| 2007/0233541 A1 | 10/2007 | Schorr et al. | |
| 2007/0233545 A1* | 10/2007 | Cala et al. | 705/9 |
| 2007/0233574 A1* | 10/2007 | Koegler et al. | 705/26 |
| 2007/0233575 A1 | 10/2007 | Berger et al. | |
| 2007/0233581 A1 | 10/2007 | Peter | |
| 2007/0233598 A1 | 10/2007 | Der Emde et al. | |
| 2007/0234282 A1 | 10/2007 | Prigge et al. | |
| 2007/0239508 A1 | 10/2007 | Fazal et al. | |
| 2007/0239569 A1 | 10/2007 | Lucas et al. | |
| 2007/0265860 A1* | 11/2007 | Herrmann et al. | 705/1 |
| 2007/0265862 A1 | 11/2007 | Freund et al. | |
| 2008/0004929 A9 | 1/2008 | Raffel et al. | |
| 2008/0017722 A1 | 1/2008 | Snyder et al. | |
| 2008/0027831 A1 | 1/2008 | Gerhardt | |
| 2008/0059387 A1* | 3/2008 | Vaidhyanathan et al. | 705/500 |
| 2008/0065437 A1 | 3/2008 | Dybvig | |
| 2008/0120129 A1 | 5/2008 | Seubert et al. | |
| 2008/0147507 A1 | 6/2008 | Langhammer | |
| 2008/0162382 A1 | 7/2008 | Clayton et al. | |
| 2008/0208707 A1 | 8/2008 | Erbey et al. | |
| 2008/0215354 A1 | 9/2008 | Halverson et al. | |
| 2008/0228536 A1* | 9/2008 | Suenbuel et al. | 705/7 |
| 2008/0262860 A1* | 10/2008 | Schneider et al. | 705/1 |
| 2008/0263152 A1* | 10/2008 | Daniels et al. | 709/203 |
| 2008/0288304 A1* | 11/2008 | Nores et al. | 705/7 |
| 2008/0294485 A1* | 11/2008 | Takeuchi et al. | 705/8 |
| 2008/0300959 A1* | 12/2008 | Sinha et al. | 705/10 |
| 2009/0037287 A1 | 2/2009 | Baitalmal et al. | |
| 2009/0037492 A1 | 2/2009 | Baitalmal et al. | |
| 2009/0063112 A1* | 3/2009 | Hader et al. | 703/6 |
| 2009/0171713 A1* | 7/2009 | Schwarz et al. | 705/7 |
| 2009/0171716 A1 | 7/2009 | Suenderhauf et al. | |
| 2009/0171733 A1* | 7/2009 | Bobak et al. | 705/8 |
| 2009/0171818 A1 | 7/2009 | Penning et al. | |
| 2009/0171819 A1* | 7/2009 | Emde et al. | 705/30 |
| 2009/0172699 A1 | 7/2009 | Jungkind et al. | |
| 2009/0189743 A1 | 7/2009 | Abraham et al. | |
| 2009/0192858 A1 | 7/2009 | Johnson | |
| 2009/0248487 A1* | 10/2009 | Santoso et al. | 705/10 |
| 2009/0327106 A1* | 12/2009 | Bartelt et al. | 705/30 |
| 2010/0070324 A1 | 3/2010 | Bock et al. | |
| 2010/0070329 A1* | 3/2010 | Engler et al. | 705/9 |
| 2010/0070331 A1 | 3/2010 | Koegler et al. | |
| 2010/0070336 A1 | 3/2010 | Koegler et al. | |
| 2010/0070391 A1 | 3/2010 | Storr et al. | |
| 2010/0070395 A1 | 3/2010 | Elkeles et al. | |
| 2010/0070555 A1 | 3/2010 | Duparc et al. | |
| 2010/0082407 A1* | 4/2010 | Akkiraju et al. | 705/10 |
| 2010/0100464 A1 | 4/2010 | Ellis et al. | |
| 2010/0131916 A1* | 5/2010 | Prigge | 717/104 |
| 2010/0138257 A1* | 6/2010 | Wocher et al. | 705/7 |
| 2010/0138269 A1 | 6/2010 | Cirpus et al. | |
| 2010/0153150 A1* | 6/2010 | Prigge et al. | 705/7 |
| 2010/0153239 A1* | 6/2010 | Liebich et al. | 705/30 |
| 2010/0153432 A1* | 6/2010 | Pfeifer et al. | 707/769 |
| 2010/0161365 A1* | 6/2010 | Lokowandt et al. | 705/8 |
| 2011/0252395 A1* | 10/2011 | Charisius et al. | 717/103 |
| 2012/0066218 A1* | 3/2012 | Rapp et al. | 707/723 |

FOREIGN PATENT DOCUMENTS

WO    WO 2005/114381    12/2005

OTHER PUBLICATIONS

Design and Analysis of a rule based knowledge, Trappey Amy;Int Journal of Manufacturing Tech; 35,3-4:385-93, Dec. 2007.*
Data mining navy flight; Meseroll Robert, IEEE Autotestcom 2007, 476-81, Sep. 2007.*
Design and Analysis of a rule based knowledge, Trappey Amy;Int Journal of Manufacturing Tech; 35,3-4:385-93, Dec. 2007.*
Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.
Anon.; "Sequenst Corp Bell Atlantic: Bell Atlantic Selects Sequent for Video-on-Demand Program; Sequent Moves to Sieze Opportunity in New Market"; Business Wire; Dec. 6, 1994.
Anon.; "State of the Art Reports™ 13,000 MAS 90® for Windows® Shipments in First Nine Months of Availability"; PR Newswire; Apr. 28, 1997.
Arch-int, S. et al.; "Development of Industrial Information Systems on the Web Using Busienss Components"; Computers in Industry; vol. 60; 2003; pp. 231-250.
Astudillo, H.; "How Conceptual System Architecture Leads to Business Process"; ACM; 2000; pp. 35-36.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyer's Guide to Software for Purchasing 2000.(Directory)"; Purchasing, vol. 129, No. 1; p. 179; Jul. 13, 2000.
Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.
Cowan, D.D. et al.; "Application Integration: Constructing Composite Applications from Interactive Components"; Software Practice and Experience; vol. 23, No. 3; Mar. 1993; pp. 255-275.
Deimel, A.; "The SAP R/3 Business Framework"; Software—Concepts & Tools; vol. 19, No. 1; 1998; pp. 29-36.
Fellner, K.J., et al.; "Classification Framework for Business Components"; System Sciences; Proceedings of the 33rd Annual Hawaii International Conference; Jan. 2000; pp. 3239-3248.
Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.
Gauthier, P. and OSS-J Architecture Board; "OSS through Java (TM) J2EE Design Guidelines"; [online]; Oct. 31, 2001; http://www.ossj.org/downloads/design_guidelines.shtml.
Gessford, J.E.; "Object-Oriented System Design"; Emerging Information Technologies for Competitive Advantage and Economic Development; Proceedings of the 1992 Information Resources Management Association International Conference; 1992; pp. 110-118.
He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.
"Hudson's Bay Company Realizes Fast ROI with the Oracle E-Business Suite"; PR Newswire; New York; Jan. 15, 2002; p. 1.
Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Linthicum, D.S.; "Chapter 9: RPCs, Messaging, and B2B Application Integration"; B2B Application Integration: E-Business Enable Your Enterprise; 2001; pp. 167-181.

Nori A.K. et al.; "Composite Applications: Process Based Application Development"; Lecture Notes in Computer Science; vol. 2444; Aug. 2003; pp. 48-53.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development"; The Data Base for Advances in Information Systems; 2003; pp. 45-46.

SAP AG; "Designing Cross Solutions"; SAP XAPPS, [online]; Sep. 2003; pp. 1-2; http://www.sap.com/belux/platform/netweaver/pdf/BWP_CAF.pdf.

Schmid, H.A.; "Business Entity Components and Buisness Process Components"; Joop; vol. 12, No. 6; Oct. 1999; pp. 6-10, 12-15.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.

Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.

Thomas, A.; "Enterprise JavaBeans Server Component Model for Java"; [online]; Dec. 1997; http://www.cs.indiana.edu/classes/b649-gann/ejb-white-paper.pdf.

Vergil Technology Ltd.; "Vergil Composite Application Builder Suite"; Product Datasheet [online]; 2003; pp. 1-5; http://www.webservicesmall.com.docs/VCAB_datasheet.pdf.

Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.

International Search Report and Written Opinion of the International Searching Authority issued in International Application No. PCT/EP2006/012625; Apr. 3, 2007; 8 pages.

International Preliminary Report on Patentability issued in International Application No. PCT/EP2006/012625; Jul. 1, 2008; 7 pages.

International Search Report and Written Opinion of the International Searching Authority issued in International Application No. PCT/EP2006/012614; Mar. 16, 2007; 7 pages.

International Preliminary Report on Patentability issued in International Application No. PCT/US2006/012614; Jul. 1, 2008; 6 pages.

International Search Report and Written Opinion of the International Searching Authority issued in International Application No. PCT/EP2006/012618; Apr. 3, 2007; 8 pages.

International Preliminary Report on Patentability issued in International Application No. PCT/EP2006/012618; Jul. 1, 2008; 7 pages.

International Search Report and Written Opinion of the International Searching Authority issued in International Application No. PCT/EP2006/012613; May 3, 2007; 6 pages.

International Preliminary Report on Patentability issued in International Application No. PCT/EP2006/012613; Jul. 1, 2008; 6 pages.

International Search Report and Written Opinion of the International Searching Authority issued in International Application No. PCT/EP2006/012624; Mar. 30, 2007; 9 pages.

International Preliminary Report on Patentability issued in International Application No. PCT/EP2006/012624; Jul. 1, 2008; 8 pages.

International Search Report and Written Opinion of the International Searching Authority issued in International Application No. PCT/EP2006/012623; May 7, 2007; 8 pages.

International Preliminary Report on Patentability issued in International Application No. PCT/EP2006/012623; Jul. 1, 2008; 7 pages.

International Search Report and Written Opinion of the International Searching Authority issued in International Application No. PCT/EP2006/012620; Mar. 21, 2007; 7 pages.

International Preliminary Report on Patentability issued in International Application No. PCT/EP2006/012620; Jul. 1, 2008; 6 pages.

International Search Report and Written Opinion of the International Searching Authority issued in International Application No. PCT/EP2006/012619; Apr. 19, 2007; 8 pages.

International Preliminary Report on Patentability issued in International Application No. PCT/EP2006/012619; Jul. 1, 2008; 7 pages.

International Search Report and Written Opinion of the International Searching Authority issued in International Application No. PCT/EP2006/012621; Apr. 19, 2007; 8 pages.

International Preliminary Report on Patentability issued in International Application No. PCT/EP2006/012621; Jul. 1, 2008; 7 pages.

International Search Report and Written Opinion of the International Searching Authority issued in International Application No. PCT/EP2007/002835; Aug. 9, 2007; 12 pages.

International Preliminary Report on Patentability issued in International Application No. PCT/EP2007/002835; Sep. 30, 2008; 8 pages.

Communication Pursuant to Article 94(3) EPC issued in European Application No. 06841224.6; May 15, 2009; 8 pages.

Communication Pursuant to Article 94(3) EPC issued in European Application No. 06847009.5; May 15, 2009; 10 pages.

Communication Pursuant to Article 94(3) EPC issued in European Application No. 07007130.3; Dec. 5, 2008; 6 pages.

Extended European Search Report issued in European Application No. 07007130.3; Oct. 5, 2007; 6 pages.

Office Action issued in U.S. Appl. No. 11/323,041; Apr. 30, 2009; 26 pages.

Office Action issued in U.S. Appl. No. 11/322,612; May 11, 2009; 24 pages.

Office Action issued in U.S. Appl. No. 11/322,772; Mar. 25, 2009; 12 pages.

Office Action issued in U.S. Appl. No. 11/323,590; Jan. 9, 2009; 23 pages.

Office Action issued in U.S. Appl. No. 11/396,288; Jan. 2, 2009; 18 pages.

Office Action issued in U.S. Appl. No. 11/396,288; Apr. 15, 2008; 26 pages.

Office Action issued in U.S. Appl. No. 11/397,029; Jul. 21, 2009; 28 pages.

Office Action issued in U.S. Appl. No. 11/323,040; Jul. 24, 2009; 35 pages.

Office Action issued in U.S. Appl. No. 11/323,590; Jul. 10, 2009; 32 pages.

Office Action issued in U.S. Appl. No. 11/322,816; Jul. 23, 2006; 41 pages.

Office Action issued in U.S. Appl. No. 11/322,851; Sep. 2, 2009; 32 pages.

Office Action issued in U.S. Appl. No. 11/323,590; Dec. 30, 2009; 31 pages.

Office Action issued in U.S. Appl. No. 11/322,482; Jan. 7, 2010; 19 pages.

Office Action issued in U.S. Appl. No. 11/322,772; Dec. 9, 2009; 14 pages.

Office Action issued in U.S. Appl. No. 11/323,039; Sep. 4, 2009; 36 pages.

Office Action issued in U.S. Appl. No. 11/323,634; Sep. 10, 2009; 15 pages.

Office Action issued in U.S. Appl. No. 11/322,383; Nov. 12, 2009; 29 pages.

Office Action issued in U.S. Appl. No. 11/396,258; Nov. 25, 2009; 9 pages.

Office Action issued in U.S. Appl. No. 12/333,085; Jun. 25, 2009; 9 pages.

Office Action issued in U.S. Appl. No. 11/396,288; Aug. 19, 2009; 20 pages.

"American Software Announces ASP Pricing Model for It's a-Applications Expense Business Solution"; PR Newswire; Mar. 6, 2000; 2 pages.

Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.
Chen, M. And Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; "Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.
Lockamy III, et al.; "Linking SCOR Planning Practices to Supply Chain Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
"Time Management with mySAP™ ERP Human Capital Management"; Downloaded Mar. 24, 2010 from <http://web.archive.org/web/20060105084834/www.sap.com/solutions/business-suite/erp/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Office Action issued in U.S. Appl. No. 11/322,772; Jul. 12, 2010; 18 pages.
Office Action issued in U.S. Appl. No. 11/322,398 on Apr. 2, 2010; 39 pages.
Notice of Allowance issued in U.S. Appl. No. 11/322,398 on Jul. 23, 2010; 38 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,259 on Jul. 6, 2010; 6 pages.
Notice of Allowance issued in U.S. Appl. No. 11/396,288; May 20, 2010; 15 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.
Office Action issued in U.S. Appl. No. 11/323,039; Apr. 14, 2010; 15 pages.
Office Action issued in U.S. Appl. No. 11/322,851; May 12, 2010; 15 pages.
Office Action issued in U.S. Appl. No. 11/322,845; Jul. 15, 2010; 16 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Advisory Action issued in U.S. Appl. No. 11/322,612; Jun. 24, 2010; 3 pages.
Notice of Allowance issued in U.S. Appl. No. 11/397,026 on Mar. 29, 2010; 17 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 12/233,554 on May 14, 2010; 11 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Notice of Allowance issued in U.S. Appl. No. 11/967,865 on Mar. 31, 2010; 16 pages.
Notice of Allowance issued in U.S. Appl. No. 11/322,482; Jul. 13, 2010; 5 pages.
Office Action issued in U.S. Appl. No. 11/323,590; Jun. 21, 2010; 25 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Mar. 23, 2010; 5 pages.
Bin et al.; "Component Model Optimization for Distributed Real-Time Embedded Software"; IEEE International Conference on Systems, Man and Cybernetics; Oct. 13, 2004; 6 pages.
Cascallar, Eduardo et al.; "Assessment in the Evaluation of Self-Regulation as a Process"; Educational Psychology Review; vol. 18, No. 3; Sep. 2006; pp. 297-306.

Cohen; "Optimizer: IBM's Multi-Echelon Inventory System for Managing Service Logistics Interfaces"; vol. 20, No. 1; 1990; pp. 65-82.

Cohen et al.; "Saturn's Supply-Chain Innovation: High Value in After Sales Service"; Sloan Management Review; vol. 41, No. 4; 2000; pp. 93-101.

Cool, David W.; "Activity Fund Accounting"; School Business Affairs; vol. 49, No. 6; Jun. 1983; pp. 50-52.

Cox et al.; "A Formal Model for Component Based Software"; IEEE; Aug. 7, 2002; 8 pages.

Ferscha et al.; "A Light-Weight Component Model for Peer-to-Peer Applications"; IEEE; Mar. 23, 2004.

Finin et al.; "KQML as an Agent Communication Language"; retrieved on Jul. 26, 2011; pp. 456-463. <http://portal.acm.org/citation.cfm?id=191322>.

Flissi et al.; "A Component-based Software Infrastructure for Ubiquitous Computing"; IEEE; Jul. 4, 2005.

Gould; "Integrating the Manufacturing Enterprise"; Automative Design & Production; 119, 1; ABI/INFORM Global; Jan. 2007; 3 pages.

Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.

Kalakota et al.; "Readings in Electronic Commerce"; Addison-Wesley Longman, Inc.; 1995; ISBN: 0-201-88060-1.

Orsburn; "Spares Management Handbook"; McGrawHill; 1991; ISBN: 0-8306-7626-0.

Papazoglou et al; "Service-Oriented Computing Research Road Map"; http://infolab.uvt.nl/pub/papazogloump-2006-96.pdf; Mar. 1, 2006; 29 pages.

SAP AG; "SAP NetWeaver Visual Composer: User Guide (SAP NetWeaver Visual Composer release 6.0)"; Document version 1.1; 2004; pp. 1-208.

SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMWFAQ_50070686_en.pdf.

Strelich, Thomas P. et al.; "Simulation-Based Transformation with the Service Integration/Interoperation Infrastructure"; Technology Review Journal; Fall/Winter 2005; pp. 99-115.

Notice of Allowance issued in U.S. Appl. No. 12/233,554 on Sep. 17, 2010; 10 pages.

Notice of Allowance issued in U.S. Appl. No. 12/233,554 on Feb. 22, 2011; 7 pages.

Notice of Allowance issued in U.S. Appl. No. 12/233,554 on Jun. 27, 2011; 7 pages.

Office Action issued in U.S. Appl. No. 12/233,550 on Jan. 12, 2011; 29 pages.

Notice of Allowance issued in U.S. Appl. No. 12/233,550 on May 11, 2011; 20 pages.

Office Action issued in U.S. Appl. No. 12/333,146 on Sep. 6, 2011; 21 pages.

Office Action issued in U.S. Appl. No. 11/323,634 on Apr. 29, 2011; 8 pages.

Office Action issued in U.S. Appl. No. 11/322,973 on Dec. 7, 2010; 13 pages.

Office Action issued in U.S. Appl. No. 11/322,973 on May 27, 2011; 15 pages.

Notice of Allowance issued in U.S. Appl. No. 11/396,327 on Nov. 30, 2010; 28 pages.

Notice of Allowance issued in U.S. Appl. No. 11/396,327 on Sep. 28, 2011; 31 pages.

Office Action issued in U.S. Appl. No. 11/404,147 on Nov. 24, 2010; 27 pages.

Office Action issued in U.S. Appl. No. 11/404,147 on Aug. 4, 2011; 26 pages.

Office Action issued in U.S. Appl. No. 12/233,479 on Oct. 27, 2011; 24 pages.

Office Action issued in U.S. Appl. No. 12/332,965 on Oct. 11, 2011; 6 pages.

Notice of Allowance issued in U.S. Appl. No. 12/233,462 on Feb. 2, 2011; 11 pages.

Notice of Allowance issued in U.S. App. No. 12/233,462 on May 18, 2011; 6 pages.

Notice of Allowance issued in U.S. Appl. No. 12/233,462 on Sep. 2, 2011; 7 pages.

Office Action issued in U.S. Appl. No. 12/233,289 on Oct. 27, 2011; 15 pages.

Office Action issued in U.S. Appl. No. 12/233,457 on May 26, 2011; 19 pages.

Office Action issued in U.S. Appl. No. 11/967,483 on Aug. 20, 2010; 10 pages.

Office Action issued in U.S. Appl. No. 11/967,483 on Mar. 4, 2011; 6 pages.

Office Action issued in U.S. Appl. No. 12/327,232 on May 26, 2011; 20 pages.

Office Action issued in U.S. Appl. No. 12/327,590 on Jun. 23, 2011; 16 pages.

Office Action issued in U.S. Appl. No. 12/327,701 on Nov. 8, 2011; 20 pages.

Notice of Allowance issued in U.S. Appl. No. 12/333,085; Sep. 13, 2010; 8 pages.

Notice of Allowance issued in U.S. Appl. No. 12/233,534 on Oct. 20, 2010; 15 pages.

Notice of Allowance issued in U.S. Appl. No. 12/233,534 on Jan. 31, 2011; 15 pages.

Notice of Allowance issued in U.S. Appl. No. 12/233,534 on May 16, 2011; 12 pages.

Notice of Allowance issued in U.S. Appl. No. 11/322,382 on Sep. 20, 2010; 6 pages.

Notice of Allowance issued in U.S. Appl. No. 11/322,382 on Jan. 6, 2011; 7 pages.

Notice of Allowance issued in U.S. Appl. No. 11/322,382 on Jul. 25, 2011; 5 pages.

Office Action issued in U.S. Appl. No. 11/396,312 on Sep. 10, 2010; 23 pages.

Office Action issued in U.S. Appl. No. 11/322,611 on Sep. 16, 2010; 21 pages.

Notice of Allowance issued in U.S. Appl. No. 11/322,610 on Sep. 23, 2010; 6 pages.

Notice of Allowance issued in U.S. Appl. No. 11/322,610 on Dec. 22, 2010; 6 pages.

Notice of Allowance issued in U.S. Appl. No. 11/322,610 on Mar. 31, 2011; 6 pages.

Notice of Allowance issued in U.S. Appl. No. 11/322,398 on Oct. 29, 2010; 18 pages.

Notice of Allowanced issued in U.S. Appl. No. 11/322,398 on Nov. 15, 2010; 20 pages.

Notice of Allowanced issued in U.S. Appl. No. 11/322,398 on May 27, 2011; 21 pages.

Office Action issued in U.S. Appl. No. 11/322,383 on May 12, 2010; 23 pages.

Office Action issued in U.S. Appl. No. 11/322,383 on Nov. 12, 2009; 23 pages.

Office Action issued in U.S. Appl. No. 11/396,236 on Oct. 28, 2010; 19 pages.

Examiner's Answer to Appeal Brief issued in U.S. Appl. No. 11/396,236 on Nov. 10, 2011; 19 pages.

Notice of Allowance issued in U.S. Appl. No. 11/396,259 on Oct. 15, 2010; 6 pages.

Notice of Allowance issued in U.S. Appl. No. 11/396,259 on Jan. 20, 2011; 6 pages.

Notice of Allowance issued in U.S. Appl. No. 11/396,259 on Aug. 5, 2011; 7 pages.

Office Action issued in U.S. Appl. No. 11/396,288 on Oct. 17, 2011; 38 pages.

Notice of Allowance issued in U.S. Appl. No. 11/396,288; Dec. 28, 2010; 4 pages.

Notice of Allowance issued in U.S. Appl. No. 11/396,288; Sep. 24, 2010; 4 pages.

Office Action issued in U.S. Appl. No. 11/396,250 on Oct. 18, 2010; 15 pages.

Notice of Allowance issued in U.S. Appl. No. 11/396,250 on Mar. 2, 2011; 13 pages.

Notice of Allowance issued in U.S. Appl. No. 11/396,250 on Jun. 24, 2011; 5 pages.
Notice of Allowance issued in U.S. Appl. No. 11/396,258 on Jul. 28, 2010; 9 pages.
Notice of Allowance issued in U.S. Appl. No. 11/396,258 on Nov. 16, 2010; 8 pages.
Notice of Allowance issued in U.S. Appl. No. 11/396,258 on Jun. 28, 2011; 9 pages.
Office Action issued in U.S. Appl. No. 11/396,252 on Nov. 10, 2011; 18 pages.
Notice of Allowance issued in U.S. Appl. No. 11/322,851 on Sep. 2, 2011; 8 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Office Action issued in U.S. Appl. No. 11/323,040 on Nov. 5, 2010; 33 pages.
Office Action issued in U.S. Appl. No. 11/323,040 on Jul. 26, 2011; 34 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages.
Office Action issued in U.S. Appl. No. 12/233,417 on Apr. 7, 2011; 32 pages.
Notice of Allowance issued in U.S. Appl. No. 12/233,417 on Sep. 14, 2011; 11 pages.
Notice of Allowance issued in U.S. Appl. No. 11/968,054 on Sep. 7, 2010; 11 pages.
Notice of Allowance issued in U.S. Appl. No. 11/968,054 on Aug. 2, 2011; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,458 on Oct. 12, 2011; 19 pages.
Office Action issued in U.S. Appl. No. 12/233,557 on Sep. 16, 2010; 16 pages.
Office Action issued in U.S. Appl. No. 11/967,489 on Sep. 28, 2011; 7 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 on Apr. 15, 2011; 12 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Oct. 6, 2010; 6 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
Anonymous; "Mastering Management"; Motor Age, vol. 25, No. 10; Oct. 2006; pp. 1-3.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.
"IDe Partners with Journyx to Offer Customers Best-in-Class Time Management Solution"; PR Newswire; Mar. 8, 2005; Business Dateline.
Kremic, Tibor; "Outsourcing Decision Support: A Survey of Benefits, Risks, and Decision Factor"; Supply Chain Management; V. 11; 2006; pp. 467-482.
Sarjoughian et al.; "CoSMoS: A Visual Environment for Component Based Modeling, Experimental Design and Simulation"; ACM; 2009; pp. 1-9.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.
"Trakware Systems Inc. Expands Management Team: Leading To-Order Software Provider Adds Experienced Global VP Sales and Marketing to its World-Class Team"; Canada NewsWire; Apr. 9, 2008.
Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.
Notice of Allowance issued in U.S. Appl. No. 12/233,550 on Jan. 9, 2012; 11 pages.
Office Action issued in U.S. Appl. No. 12/333,146 on Feb. 2, 2012; 21 pages.
Notice of Allowance issued in U.S. Appl. No. 11/323,634 on Jan. 25, 2012; 5 pages.
Office Action issued in U.S. Appl. No. 11/322,816; Jul. 23, 2009; 41 pages.
Office Action issued in U.S. Appl. No. 12/233,479 on May 7, 2012; 26 pages.
Notice of Allowance issued in U.S. Appl. No. 12/332,965 on Jun. 11, 2012; 21 pages.
Notice of Allowance in U.S. Appl. No. 12/233,462 on Dec. 12, 2011; 6 pages
Notice of Allowance in U.S. Appl. No. 12/233,462 on Apr. 5, 2012; 7 pages.
Notice of Allowance issued in U.S. Appl. No. 12/233,289 on Feb. 15, 2012; 11 pages.
Notice of Allowance issued in U.S. Appl. No. 12/233,457 on Nov. 3, 2011; 12 pages.
Notice of Allowance issued in U.S. Appl. No. 12/327,232 on Nov. 2, 2011; 16 pages.
Notice of Allowance issued in U.S. Appl. No. 12/327,590 on Dec. 28, 2011; 10 pages.
Notice of Allowance issued in U.S. Appl. No. 12/327,701 on Apr. 6, 2012; 9 pages.
Notice of Allowance issued in U.S. Appl. No. 12/233,534 won Dec. 28, 2011; 7 pages.
Notice of Allowanced issued in U.S. Appl. No. 11/322,398 on Oct. 18, 2011; 7 pages.
Notice of Allowance issued in U.S. Appl. No. 11/396,259 on Mar. 15, 2012; 7 pages.
Notice of Allowance issued in U.S. Appl. No. 11/396,250 on Dec. 7, 2011; 6 pages.
Notice of Allowance issued in U.S. Appl. No. 11/396,258 on Feb. 3, 2012; 12 pages.
Notice of Allowance issued in U.S. Appl. No. 11/322,851 on Mar. 1, 2012; 9 pages.
Notice of Allowance issued in U.S. Appl. No. 11/322,845; Nov. 13, 2011; 9 pages.
Office Action issued in U.S. Appl. No. 11/397,026; Jul. 21, 2009; 28 pages.
Notice of Allowance issued in U.S. Appl. No. 11/397,026 on Nov. 4, 2011; 8 pages.
Notice of Allowance issued in U.S. Appl. No. 11/397,026 on Feb. 23, 2012; 8 pages.
Notice of Allowance issued in U.S. Appl. No. 12/233,520 on Nov. 10, 2011; 22 pages.

Office Action issued in U.S. Appl. No. 11/967,489 on Feb. 6, 2012; 9 pages.
Notice of Allowance issued in U.S. Appl. No. 11/967,393 on Nov. 9, 2011; 9 pages.
Office Action issued in U.S. Appl. No. 11/967,387 on Apr. 12, 2012; 13 pages.

Office Action issued in U.S. Appl. No. 12/327,737 on Mar. 26, 2012; 14 pages.
Notice of Allowance issued in U.S. Appl. No. 12/233,075 on Mar. 22, 2012; 25 pages.

* cited by examiner

ARCHITECTURAL DESIGN FOR EMBEDDED SUPPORT APPLICATION SOFTWARE

BACKGROUND

The subject matter of this patent application relates to computer software architecture, and, more particularly, to the architecture of application software for embedded support.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a software application implementing embedded support.

In its various aspects, the subject matter described in the specification can be implemented as methods, systems, and apparatus, including computer program products, for implementing a software architecture design for a software application implementing embedded support. The software application is structured as multiple process components interacting with each other through service interfaces, and multiple service operations, each being implemented for a respective process component. The process components include a Support Request Processing process component and a Software Problem Reporting process component.

In its various aspects, the subject matter can further be implemented as methods, systems, and apparatus, including computer program products, implementing a software architecture design for a software application that is adapted to interact with external software systems through the service operations described in reference to external process components, or a subcombination of them.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

DETAILED DESCRIPTION

Figure 1:
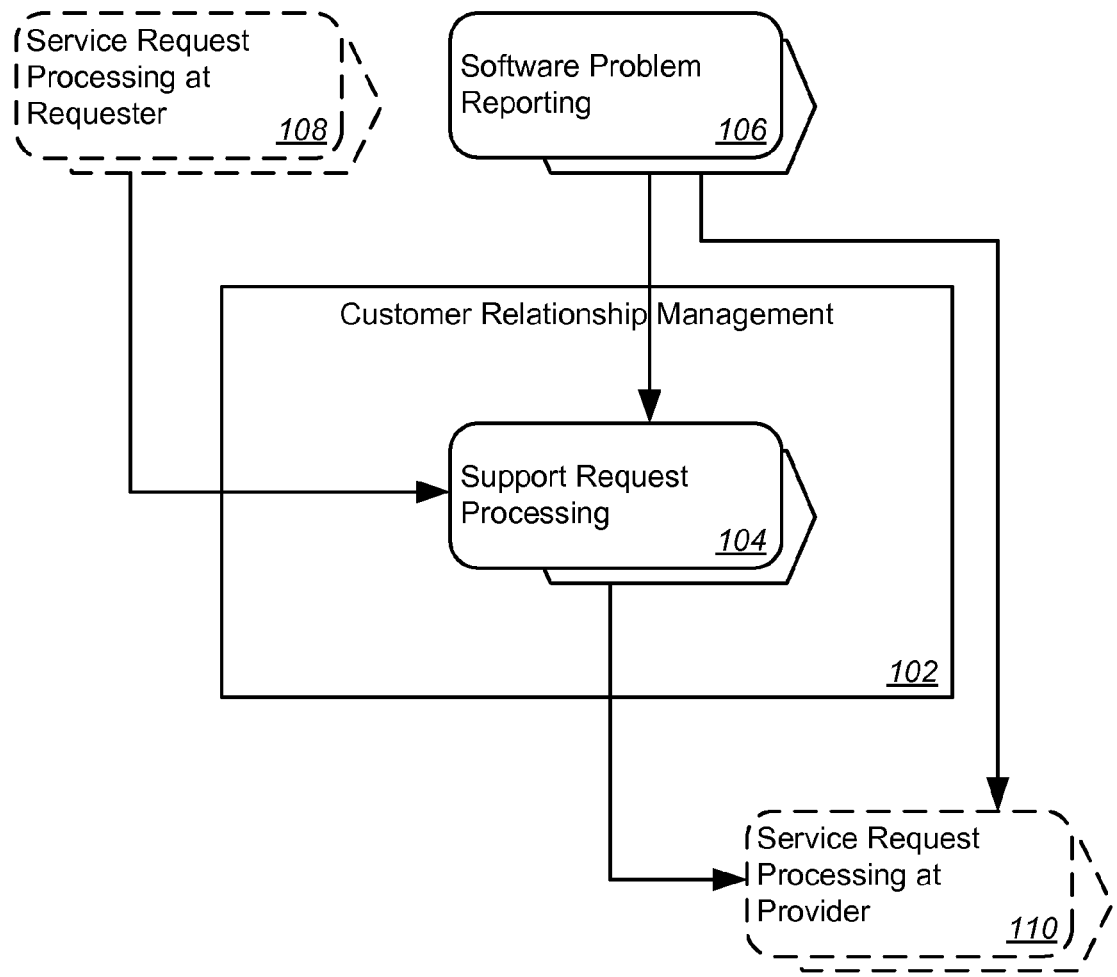
FIG. 1 is a block diagram of a software architectural design for an embedded support software application.

FIG. 1 shows the software architectural design for an embedded support software application. The embedded support application is software that describes the operational processes in an internal IT service desk based on support requests, including their integration with an external service provider.

As shown in FIG. 1, the embedded support design includes a Customer Relationship Management deployment unit 102 that can handle the management of customer-related activities within marketing, presales, sales and service, including the recording and processing of interactions throughout the customer life cycle.

The Customer Relationship Management deployment unit 102 includes a Support Request Processing process component 104 that handles a request reflecting the initial inquiry to clarify and solve an incident during the operations of an IT system, sent by an end user of the system or the system itself to the service processing team. The Support Request can document the incident, the solution process, and the solutions found. It can contain information on the user, the system, and on the nature and context of the incident. Additionally, the Support Request may contain a description of the symptom and a classification of the incident, the underlying problem, and/or the reason, to name a few examples.

The foundation layer, described below, includes a Software Problem Reporting process component 106 that can be used for collecting context data in an IT solution, summarizing the data in a software problem report, and sending the report to the appropriate service desk. Software Problem Reporting functionality can be deployed on more than one decentralized system and information can be forwarded to a central service desk.

A number of external process components, described below, will be used to describe the architectural design. These include a Service Request Processing at Requester process component 108 and a Service Request Processing at Provider process component 110. The Service Request Processing at Requester process component 108 can handle the logging and resolving of service requests concerning customer issues at an external customer site. The Service Request Processing at Provider process component 110 can handle the logging and resolving of service requests concerning customer issues at an external provider site.

Figure 2:
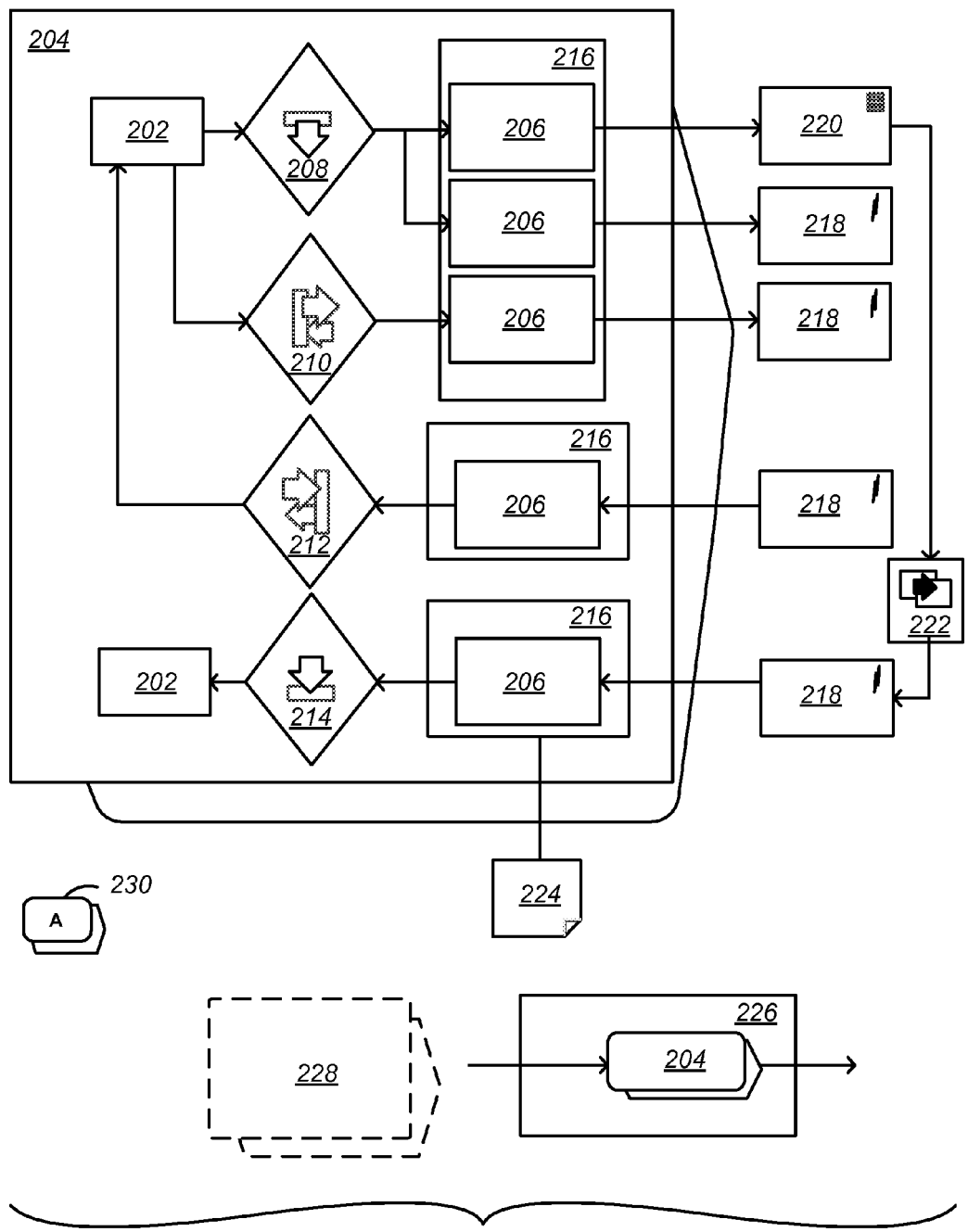
FIG. 2 illustrates the elements of the architecture as they are drawn in the figures.

FIG. 2 illustrates the elements of the architecture as they are drawn in the figures of this patent application. The elements of the architecture include the business object 202, the process component 204, the operation 206, the outbound process agent 208, the synchronous outbound process agent 210, the synchronous inbound process agent 212, the inbound process agent 214, the service interface or interface 216, the message 218, the form message 220, the mapping entity 222, the communication channel template 224, and the deployment unit 226.

Not explicitly represented in the figures is a foundation layer that contains all fundamental entities that are used in multiple deployment units 226. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

A process component of an external system is drawn as a dashed-line process component 228. Such a process component 228 represents the external system in describing interactions with the external system; however, the process component 228 need not represent more of the external system than is needed to produce and receive messages as required by the process component that interacts with the external system.

The connector icon 230 is used to simplify the drawing of interactions between process components 204. Interactions between process component pairs 204 involving their respective business objects 202, process agents (at 208, 210, 212, and 214), operations 206, interfaces 216, and messages (at 218 and 22) are described as process component interactions, which determine the interactions of a pair of process components across a deployment unit boundary, i.e., from one deployment unit 226 to another deployment unit 226. Interactions between process components 204 are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components 204, but interfaces 216, process agents (at 208, 210, 212, and 214), and business objects 202 that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component 204 is described as being contained in a deployment unit 226. It should be understood, however, that such operational inclusion can be realized in a variety of ways and is not limited to a physical inclusion of the entirety of one element in another.

The architectural elements include the business object 202. A business object 202 is a representation of a type of a uniquely identifiable business entity (an object instance) described by a structural model. Processes operate on business objects. This example business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component 204, is an object that encapsulates transactional data (i.e., data that is valid for a point in time). The term business object will be used generically to refer to a business process object and a master data object, unless the context requires otherwise. Properly implemented, business objects 202 are implemented free of redundancies.

The architectural elements also include the process component 204. A process component 204 is a software package that realizes a business process and generally exposes its functionality as services. The functionality includes the ability to perform all or parts of particular kinds of business transactions. A process component 204 contains one or more semantically related business objects 202. Any business object belongs to no more than one process component. Process components can be categorized as a standard process component, a process component at a business partner, a third party process component, or a user centric process component. The standard process component (named simply process component) is a software package that realizes a business process and exposes its functionality as services. The process component at a business partner is a placeholder for a process component (or other technology that performs the essential functions of the process component) used at a business partner. The third party process component is a process component (or other technology that performs the essential functions of the process component) provided by a third party. The user centric process component is a process component containing user interface parts.

Process components 204 are modular and context-independent. That they are context-independent means that a process component 204 is not specific to any specific application and is reusable. The process component 204 is often the smallest (most granular) element of reuse in the architecture.

The architectural elements also include the operation 206. An operation 206 belongs to exactly one process component 204. A process component 204 generally is able to perform multiple operations 206. Operations 206 can be synchronous or asynchronous, corresponding to synchronous or asynchronous process agents (e.g. at 208, 210, 212, and 214), which will be described below. Operation 206 may be the smallest, separately-callable function, described by a set of data types used as input, output, and fault parameters serving as a signature.

The architectural elements also include the service interface 216, referred to simply as the interface. An interface 216 is a named group of operations 206. Interface 216 typically specifies inbound service interface functionality or outbound service interface functionality. Each operation 206 belongs to exactly one interface 216. An interface 216 belongs to exactly one process component 204. A process component 204 might contain multiple interfaces 216. In some implementations, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations 206 directed to the same other process component 204 are in one interface 216.

The architectural elements also include the message 218. Operations 206 transmit and receive messages 218. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component. In some implementations, the message is a form based message 220 that can be translated into a recognized format for an external process component 228. The form message type 220 is a message type used for documents structured in forms. The form message type 220 can be used for printing, faxing, emailing, or other events using documents structured in forms. In some implementations, the form message type 220 provides an extended signature relative to the normal message type. For example, the form message type 220 can include text information in addition to identification information to improve human reading.

The architectural elements also include the process agent (e.g. at 208, 210, 212, and 214). Process agents do business processing that involves the sending or receiving of messages 218. Each operation 206 will generally have at least one associated process agent. The process agent can be associated with one or more operations 206. Process agents (at 208, 210, 212, and 214) can be either inbound or outbound, and either synchronous or asynchronous.

Asynchronous outbound process agents 208 are called after a business object 202 changes, e.g., after a create, update, or delete of a business object instance. Synchronous outbound process agents 210 are generally triggered directly by a business object 202.

An outbound process agent (208 and 210) will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents (212 and 214) are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents (210 and 212) are used when a process component requires a more or less immediate response from another process component, and is waiting for that response to continue its work.

Operations and process components are described in this specification in terms of process agents. However, in alternative implementations, process components and operations can be implemented without use of agents by using other conventional techniques to perform the functions described in this specification.

The architectural elements also include the communication channel template. The communication channel template is a modeling entity that represents a set of technical settings used for communication. The technical settings can include details for inbound or outbound processing of a message. The details can be defined in the communication channel template. In particular, the communication channel template defines an adapter type, a transport protocol, and a message protocol. In some implementations, various other parameters may be defined based on a selected adapter type. For example, the communication channel template can define a security level, conversion parameters, default exchange infrastructure parameters, processing parameters, download URI parameters, and specific message properties.

The communication channel template 224 can interact with internal or external process components (at 204 and 228). To interact with an internal process component, the communication channel template is received and uploaded to be used with an operation and interface pair. To interact with an external process component, the communication channel template is received and uploaded to be used with an external entity, such as an external bank, business partner, or supplier.

The architectural elements also include the deployment unit 226. A deployment unit 226 includes one or more process components 204 that are deployed together on a single computer system platform. Conversely, separate deployment units can be deployed on separate physical computing systems. For this reason, a boundary of a deployment unit 226 defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components 204 of one instance of one deployment unit 226.

The process components 204 of one deployment unit 226 interact with those of another deployment unit 226 using messages 218 passed through one or more data communication networks or other suitable communication channels. Thus, a deployment unit 226 deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units 226 is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components 204 that interact with other process components 204 or external systems only through messages 218, e.g., as sent and received by operations 206, can also be replaced as long as the replacement supports the operations 206 of the original 204.

In contrast to a deployment unit 226, the foundation layer does not define a limit for application-defined transactions. Deployment units 226 communicate directly with entities in the foundation layer, which communication is typically not message based. The foundation layer is active in every system instance on which the application is deployed. Business objects 202 in the foundation layer will generally be master data objects. In addition, the foundation layer will include some business process objects that are used by multiple deployment units 226. Master data objects and business process objects that should be specific to a deployment unit 226 are assigned to their respective deployment unit 226.

Interactions Between Process Components "Software Problem Reporting" and "Service Request Processing at Provider"

Figure 3:
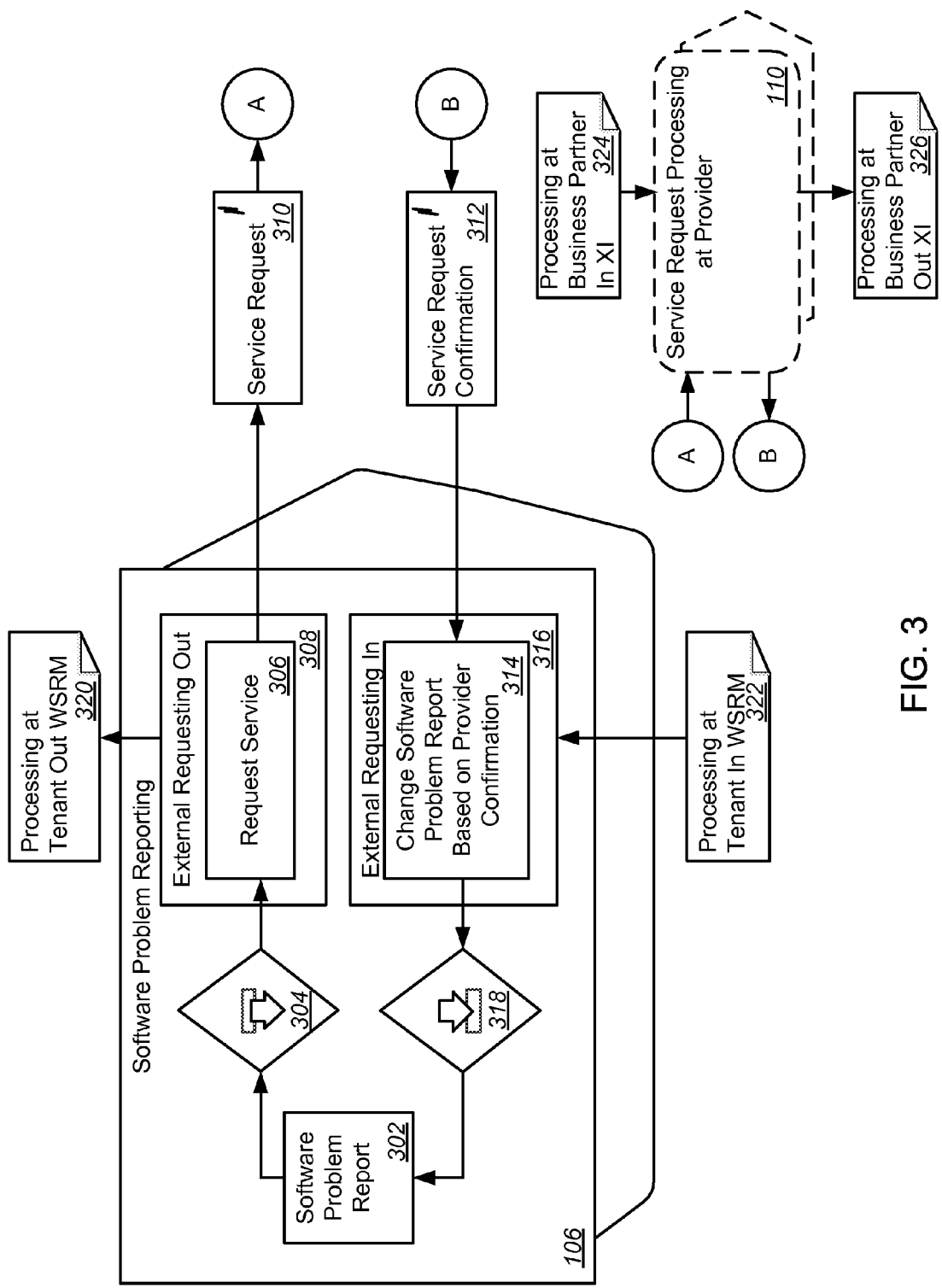
FIG. 3 is a block diagram showing example interactions between a Software Problem Reporting process component and a Service Request Processing at Provider process component.

FIG. 3 is a block diagram showing interactions between the Software Problem Reporting process component 106 and the Service Request Processing at Provider process component 110 in the architectural design of FIG. 1.

As shown in FIG. 3, the Software Problem Reporting process component 106 includes a Software Problem Report business object 302. The Software Problem Report business object 302 represents a report about an incident in an IT solution.

A Request Service from Software Problem Report to Provider outbound process agent 304 can be used to invoke a Request Service operation 306. The outbound process agent 304 can collect data associated with the Software Problem Report business object 302 and send the data to an external service desk. The Request Service operation 306 can request the creating/changing of a service request document in an external service desk. The Request Service operation 306 is included in an External Requesting Out interface 308. The operation 306 generates a Service Request message 310.

The Service Request Processing at Provider process component 110 can receive the Service Request message 310. An operation performed by the Service Request Processing at Provider process component 110 can generate a Service Request Confirmation message 312.

The message 312 is received in a Change Software Problem Report Based on Provider Confirmation operation 314. The operation 314 is included in an External Requesting In interface 316. The Change Software Problem Report Based on Provider Confirmation operation 314 uses a Change Software Problem Report Based on Provider Confirmation inbound process agent 318 to update the Software Problem Report business object 302.

The Software Problem Reporting process component 106 sends information to the Service Request Processing at Provider business process 110 using a Process at Tenant Out Web Services Reliable Messaging (WSRM) communication channel template 320. The External Requesting Out interface 308 sends information to the Software Problem Reporting process component 106 using the Process at Tenant Out WSRM communication channel template 320. The communication channel template 320 can define protocols and parameters used for communication with an external party. The Software Problem Reporting process component 106 receives information from the Service Request Processing at Provider process component 110 using a Processing at Tenant In WSRM communication channel template 322.

The Service Request Processing at Provider process component 110 receives information from the Software Problem Reporting process component 106 using a Processing at Business Partner In Exchange Infrastructure (XI) communication channel template 324. The communication channel template 324 can define protocols and parameters used for communication with an external party. The Service Request Processing at Provider process component 110 sends information to the Software Problem Reporting process component 106 using a Processing at Business Partner Out XI communication channel template 326. The communication channel template 326 can define protocols and parameters used for communication with an external party. While XI represents Exchange Infrastructure, any similar or suitable third-party or proprietary tool may be used to perform the functions provided by or described in relation to XI.

Interactions Between Process Components "Software Problem Reporting" and "Support Request Processing"

Figure 4:
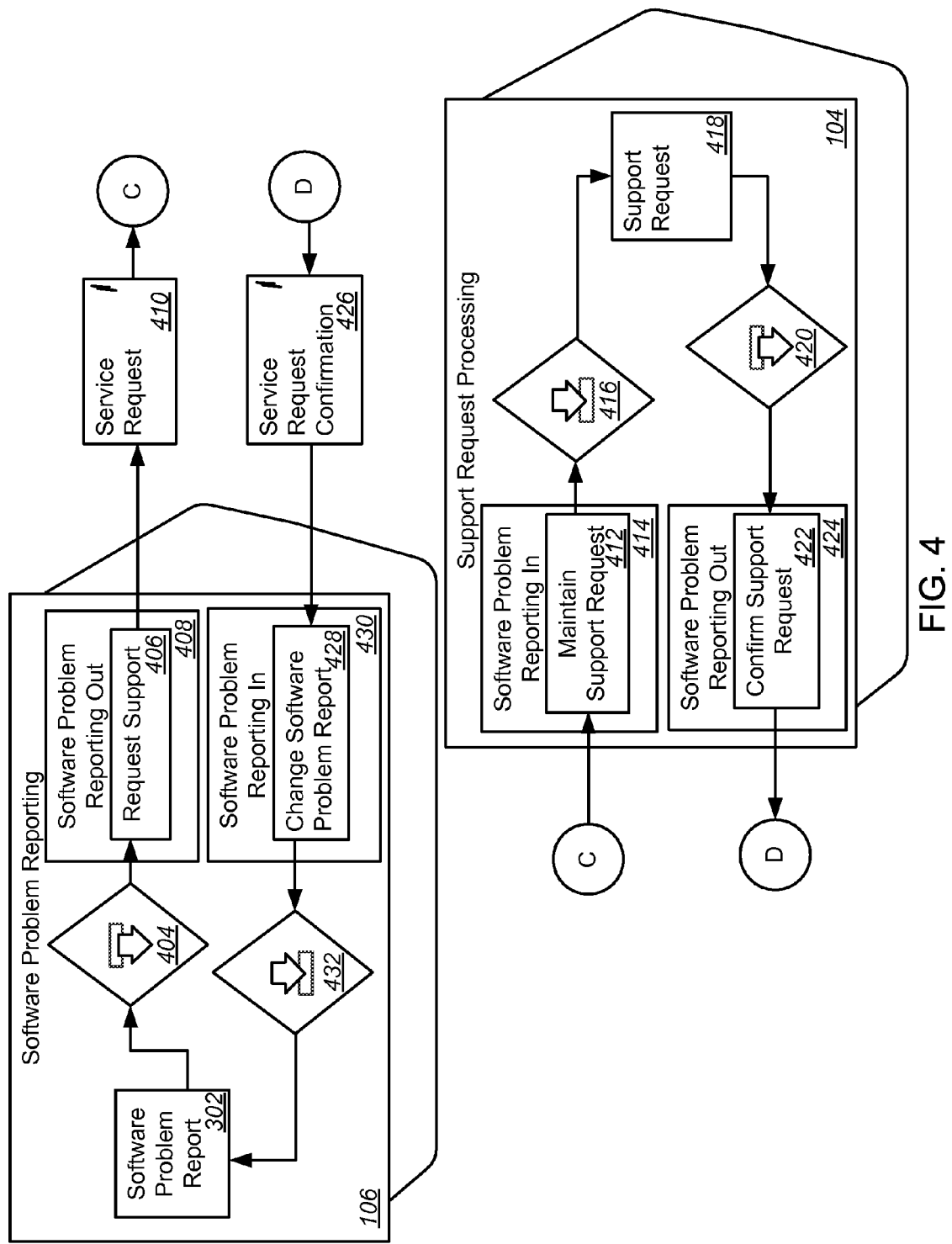
FIG. 4 is a block diagram showing example interactions between the Software Problem Reporting process component and a Support Request Processing process component.

FIG. 4 is a block diagram showing interactions between the Software Problem Reporting process component 106 and the Support Request Processing process component 104 in the architectural design of FIG. 1. The interaction starts when a Software Problem Report is collected.

As shown in FIG. 4, the Software Problem Reporting process component 106 includes the Software Problem Report business object 302. The Software Problem Report business object 302 represents a report about an incident in an IT solution.

The Software Problem Report business object 302 uses a Request Support from Software Problem Report to Support Request Processing outbound process agent 404 to invoke a Request Support operation 406. The Request Support operation 406 requests the creating/changing of a support request document in a service desk. The Request Support operation 406 is included in a Software Problem Reporting Out interface 408. The operation 406 generates a Service Request message 410.

A Maintain Support Request operation 412 receives the Service Request message 410. The operation 412 maintains a support request based on information from a software problem report. The Maintain Support Request operation 412 is included in a Software Problem Reporting In interface 414.

A Maintain Support Request inbound process agent 416 updates a Support Request business object 418. The Support Request business object 418 handles a request by a user of the system or of the system itself to a service provider (IT Service Desk) to clarify and correct an error in an IT solution. The business object 418 can document the error, the resolution process, and the solutions found.

The Support Request business object 418 uses a Confirm Support Request from Support Request to Software Problem Reporting outbound process agent 420 to invoke a Confirm Support Request operation 422. The Confirm Support Request operation 422 confirms to Software Problem Reporting that a support request document has been processed. The operation 422 is included in a Software Problem Reporting Out interface 424. The Confirm Support Request operation 422 generates a Service Request Confirmation message 426.

The message 426 is received in a Change Software Problem Report operation 428. The Change Software Problem Report operation 428 changes the Software Problem Report, based on a confirmation from a service desk. The operation 428 is included in a Software Problem Reporting In interface 430. The Change Software Problem Report operation 428 uses a Change Software Problem Report Based on Confirmation inbound process agent 432 to update the Software Problem Report business object 302.

Interactions Between Process Components "Service Request Processing at Requester" and "Support Request Processing"

Figure 5:
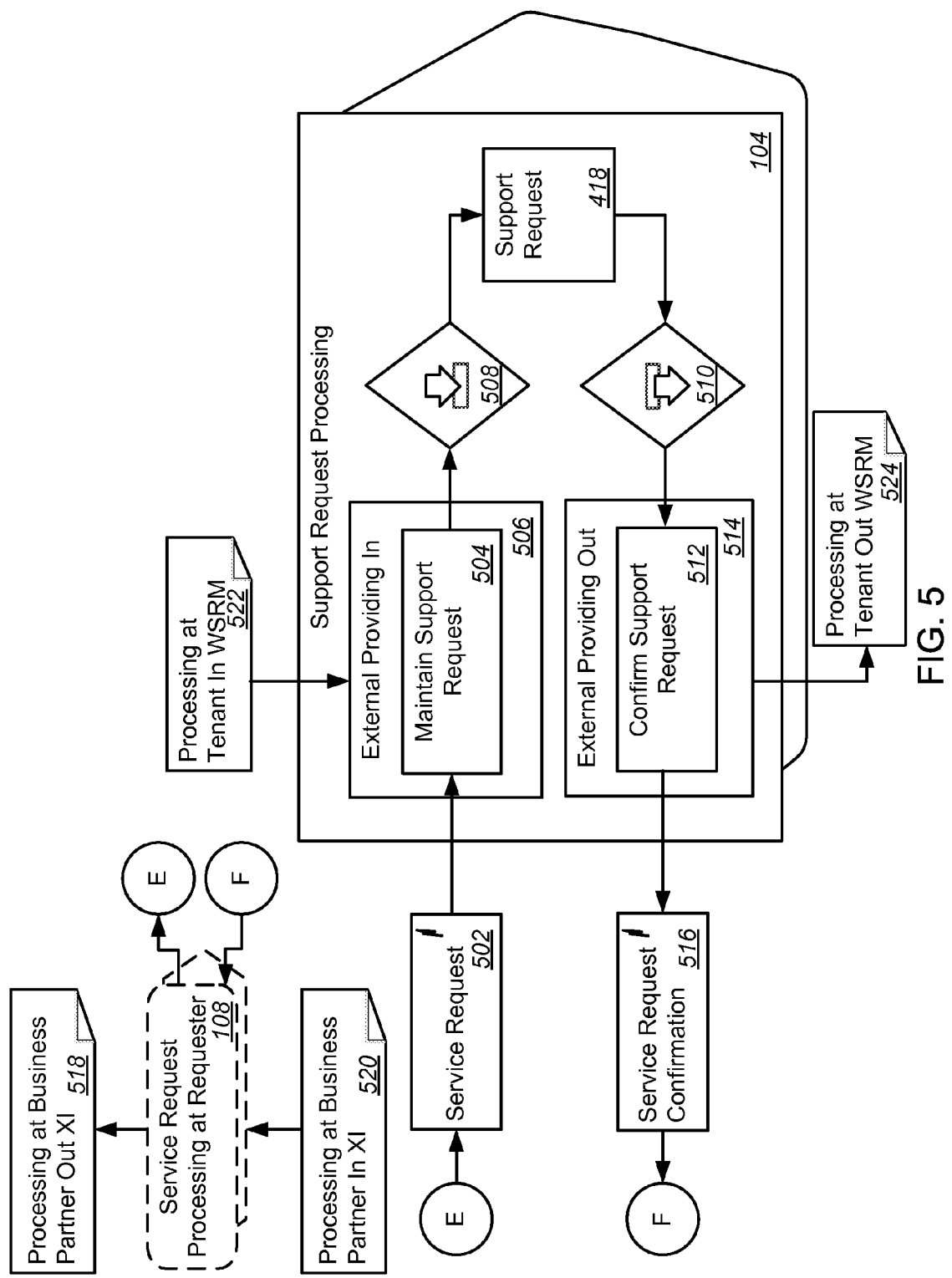
FIG. 5 is a block diagram showing example interactions between a Service Request Processing at Requestor process component and the Support Request Processing process component.

FIG. 5 is a block diagram showing interactions between the Service Request Processing at Requester process component 108 and the Support Request Processing process component 104 in the architectural design of FIG. 1.

Operations performed by the Service Request Processing at Requester process component 108 can generate a Service Request message 502. A Maintain Support Request operation 504 receives the Service Request message 502. The operation 504 can maintain a support request based on information from a software problem report. The Maintain Support Request operation 504 is included in an External Providing In interface 506.

A Maintain Support Request Based on External Request inbound process agent 508 updates the Support Request business object 418. The Support Request business object 418 handles a request by a user of the system to a service provider (IT Service Desk) to clarify and correct an error in an IT solution.

The Support Request business object 418 uses a Confirm Support Request to External Requester outbound process agent 510 to invoke a Confirm Support Request operation

512. The Confirm Support Request operation 512 confirms the creation/change as well as the processing progress of a Support Request Document to an external service desk. The operation 512 is included in an External Providing Out interface 514. The Confirm Support Request operation 512 generates a Service Request Confirmation message 516. The message 516 can be received by an operation performed by the Service Request Processing at Requester process component 108.

The Support Request Processing process component 104 sends information to the Service Request Processing at Request process component 108 using a Process at Tenant Out Web Services Reliable Messaging (WSRM) communication channel template 524. The External Providing Out interface 514 sends information to the Support Request Processing process component 104 using the Process at Tenant Out WSRM communication channel template 524. The communication channel template 524 can define protocols and parameters used for communication with an external party. The Support Request Processing process component 104 sends information to the Service Request Processing at Requester process component 108 using a Processing at Tenant In WSRM communication channel template 522.

The Service Request Processing at Requester process component 108 receives information from the Support Request Processing process component 104 using a Processing at Business Partner In XI communication channel template 520. The communication channel template 520 can define protocols and parameters used for communication with an external party. The Service Request Processing at Requester process component 108 sends information to the Support Request Processing process component 104 using a Processing at Business Partner Out XI communication channel template 518. The communication channel template 518 can define protocols and parameters used for communication with an external party.

Interactions Between Process Components "Support Request Processing" and "Service Request Processing at Provider"

Figure 6:
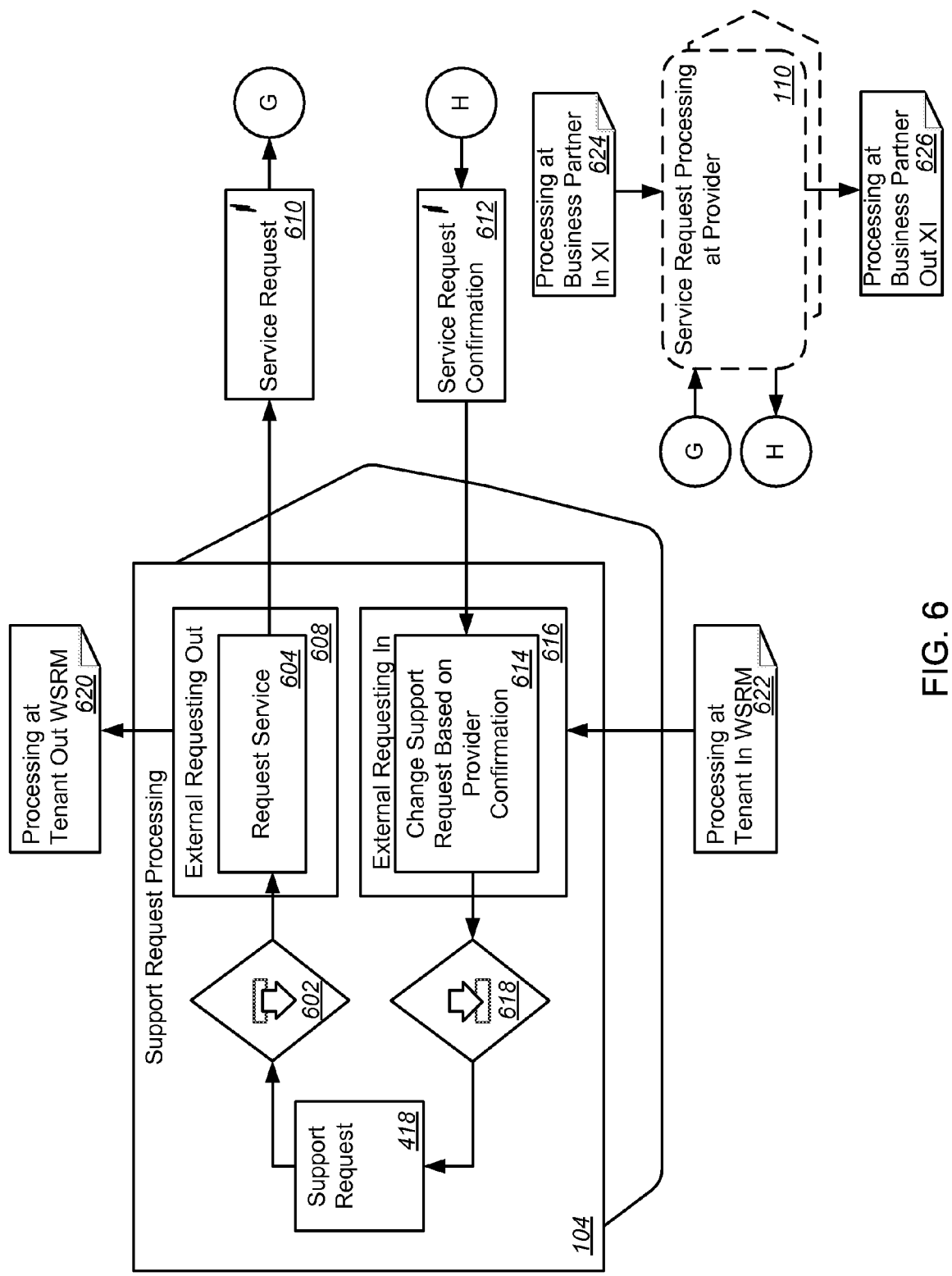
FIG. 6 is a block diagram showing example interactions between the Support Request Processing process component and the Service Request Processing at Provider process component.

FIG. 6 is a block diagram showing interactions between the Support Request Processing process component 104 and the Service Request Processing at Provider process component 110 in the architectural design of FIG. 1. The interaction starts when the key user or system administrator forwards a Support Request to an external provider.

As shown in FIG. 6, the Support Request Processing process component 104 includes the Support Request business object 418. The Support Request business object 418 handles a request by a user of the system or of the system itself to a service provider (IT Service Desk) to clarify and correct an error in an IT solution.

The Support Request business object 418 uses a Request Service from Support Request to Provider outbound process agent 602 to invoke a Request Service operation 604. The Request Service operation 604 requests that a service document be processed in an external system. The Request Service operation 604 is included in an External Requesting Out interface 608. The operation 604 generates a Service Request message 610.

The Service Request Processing at Provider process component 110 can receive the Service Request message 610. An operation performed by the Service Request Processing at Provider process component 110 can generate a Service Request Confirmation message 612.

The message 612 is received in a Change Support Request Based on Provider Confirmation operation 614. The Change Support Request Based on Provider Confirmation operation 614 updates a support request based on data from the external provider system. The operation 614 is included in an External Requesting In interface 616. The Change Support Request Based on Provider Confirmation operation 614 uses a Change Support Request Based on Provider Confirmation inbound process agent 618 to update the Support Request business object 418.

The Support Request Processing process component 104 sends information to the Service Request Processing at Provider process component 110 using a Process at Tenant Out Web Services Reliable Messaging (WSRM) communication channel template 620. The External Providing Out interface 608 sends information to the Support Request Processing process component 104 using the Process at Tenant Out WSRM communication channel template 620. The communication channel template 620 can define protocols and parameters used for communication with an external party. The Support Request Processing process component 104 receives information from the Service Request Processing at Provider process component 110 using a Processing at Tenant In WSRM communication channel template 622.

The Service Request Processing at Provider process component 110 receives information from the Support Request Processing process component 104 using a Processing at Business Partner In XI communication channel template 624. The communication channel template 624 can define protocols and parameters used for communication with an external party. The Service Request Processing at Provider process component 110 sends information to the Support Request Processing process component 104 using a Processing at Business Partner Out XI communication channel template 626. The communication channel template 626 can define protocols and parameters used for communication with an external party.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g. a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising instructions encoded on a non-transitory, computer-readable medium, the instructions being structured as process components interacting with each other through service interfaces, the instructions operable when executed by at least one processor to:

define a plurality of process components, each of the process components comprising a modular and application-independent package of reusable, granular software implementing a respective and distinct business process, the business process comprising functionality exposed by the process component via a corresponding service interface, the plurality of process components including:
  a support request processing process component for handling processing of requests to clarify and solve incidents;
  a software problem reporting process component for handling collection and reporting of context data;
  a service request processing at requester process component for handling logging and resolving of service requests concerning customer issues at an external customer site; and
  a service request processing at provider process component for handling logging and resolving of service requests concerning customer issues at an external provider site; and define a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based pair-wise interaction between the respective process components of the respective operations, the pair-wise interactions between pairs of the process components including interactions between:
  the support request processing process component and the software problem reporting process component, where the pair-wise interaction between the support request processing process component and the software problem reporting process component includes the transmission of:
    a first type of service request message from the software problem reporting process component to the support request processing process component, the first type of service request message comprising a request for service based on information from a software problem report; and a first type of service request confirmation message from the support request processing process component to the software problem reporting process component, the first type of service request confirmation message comprising a confirmation of a service request from a service desk;

the software problem reporting process component and the service request processing at provider process component, where the pair-wise interaction between the software problem reporting process component and the service request processing at provider process component includes the transmission of:
  a second type of service request message from the software problem reporting process component to the service request processing at provider process component, the second type of service request message comprising a request for creating or changing a service request document in an external service desk; and
  a second type of service request confirmation message from the support request at provider processing process component to the service request processing at requester process component, the second type of service request confirmation message comprising a confirmation associated with a request for creating or changing a service request in an external service desk;

the service request processing at requester process component and the support request processing process component, where the pair-wise interaction between the service request processing at requester process component and the support request processing process component includes the transmission of:
  a third type of service request message from the service request processing at requester process component to the support request processing process component, the third type of service request message comprising a request for creation or modification to a service request based on information from a software problem report identified by the external requester; and
  a third type of service request confirmation message from the support request processing process component to the service request processing at requester process component, the third type of service request confirmation message comprising a confirmation of a requested creation or modification to the identified service request and the confirmation including information on processing progress of the service request to an external service desk of the requester associated with the identified service request; and the support request processing process component and the service request processing at provider process component, where the pair-wise interaction between the software problem reporting process component and the service request processing at provider process component includes the transmission of:
  a fourth type of service request message from the support request processing process component to the service request processing at provider process component, the fourth type of service request message comprising a request that a service document be processed in an external provider system; and
  a fourth type of service request confirmation message from the service request processing at provider process component to the support request processing process component, the fourth type of service request confirmation message comprising a confirmation of the fourth type of service request and an update associated with the processed service document based on data from the corresponding external provider system.

2. The product of claim 1, wherein:
each of the plurality of process components is assigned to exactly one deployment unit among multiple deployment units, and each deployment unit is deployable on a separate computer hardware platform independent of every other deployment unit; and
all interaction between a process component in one deployment unit and any other process component in any other deployment unit takes place through the respective service interfaces of the two process components.

3. The product of claim 2, wherein the deployment units comprise:
a customer relationship management deployment unit that includes the support request processing process component.

4. The product of claim 1, wherein:
each of the process components includes one or more business objects; and
none of the business objects of any one of the process components interacts directly with any of the business objects included in any of the other process components.

5. The product of claim 4, wherein the business objects comprise a business process object.

6. The product of claim 4, wherein none of the business objects included in any one of the process components is included in any of the other process components.

7. The product of claim 1, further comprising a plurality of process agents, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

8. The product of claim 7, wherein each inbound process agent comprises a first inbound process agent operable to start an execution of a business process step requested in a first inbound message by creating or updating at least one business object instance.

9. The product of claim 7, wherein the outbound process agents comprise a first asynchronous outbound process agent that is called after a business object that is associated with the first outbound process agent changes.

10. The product of claim 1, wherein the operations comprise synchronous and asynchronous operations.

11. A system, comprising:
a computer system comprising at least one hardware platform for executing computer instructions, the computer instructions structured as a plurality of process components interacting with each other through service interfaces, each hardware platform including at least one processor for executing the computer instructions;
at least one memory storing a plurality of process components executable by the respective processor of the particular hardware platform, each of the process components comprising a modular and application-independent package of reusable granular software implementing a respective and distinct business process, the business process comprising functionality exposed by the process component via at least one service interface, the plurality of process components including:

a support request processing process component for handling processing of requests to clarify and solve incidents;

a software problem reporting process component for handling collection and reporting of context data;

a service request processing at requester process component for handling logging and resolving of service requests concerning customer issues at an external customer site; and a service request processing at provider process component for handling logging and resolving of service requests concerning customer issues at an external provider site; and the memory further storing a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based pair-wise interaction between the respective process components of the respective operations, the pair-wise interactions between pairs of the process components including interactions between:

the support request processing process component and the software problem reporting process component, where the pair-wise interaction between the support request processing process component and the software problem reporting process component includes the transmission of:

a first type of service request message from the software problem reporting process component to the support request processing process component, the first type of service request message comprising a request for service based on information from a software problem report; and a first type of service request confirmation message from the support request processing process component to the software problem reporting process component, the first type of service request confirmation message comprising a confirmation of a service request from a service desk;

the software problem reporting process component and the service request processing at provider process component, where the pair-wise interaction between the software problem reporting process component and the service request processing at provider process component includes the transmission of:

a second type of service request message from the software problem reporting process component to the service request processing at provider process component, the second type of service request message comprising a request for creating or changing a service request document in an external service desk; and a second type of service request confirmation message from the support request at provider processing process component to the service request processing at requester process component, the second type of service request confirmation message comprising a confirmation associated with a request for creating or changing a service request in an external service desk;

the service request processing at requester process component and the support request processing process component, where the pair-wise interaction between the service request processing at requester process component and the support request processing process component includes the transmission of:

a third type of service request message from the service request processing at requester process component to the support request processing process component, the third type of service request message comprising a request for creation or modification to a service request based on information from a software problem report identified by the external requester; and a third type of service request confirmation message from the support request processing process component to the service request processing at requester process component, the third type of service request confirmation message comprising a confirmation of a requested creation or modification to the identified service request and the confirmation including information on processing progress of the service request to an external service desk of the requester associated with the identified service request; and the support request processing process component and the service request processing at provider process component, where the pair-wise interaction between the software problem reporting process component and the service request processing at provider process component includes the transmission of:

a fourth type of service request message from the support request processing process component to the service request processing at provider process component, the fourth type of service request message comprising a request that a service document be processed in an external provider system; and a fourth type of service request confirmation message from the service request processing at provider process component to the support request processing process component, the fourth type of service request confirmation message comprising a confirmation of the fourth type of service request and an update associated with the processed service document based on data from the corresponding external provider system.

12. The system of claim 11, wherein:

each of the process components includes one or more business objects; and none of the business objects of any one of the process components interacts directly with any of the business objects included in any of the other process components.

13. The system of claim 11, wherein none of the business objects included in any one of the process components is included in any of the other process components.

14. The system of claim 11, further comprising a plurality of process agents, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

15. The system of claim 11, the system comprising one hardware platform, wherein:
the support request processing process component is deployed on one hardware platform.

16. A method for developing a computer software application, comprising:
obtaining, in a programmable computer system having at least one processor, a storage medium, and an interface, digital data representing an architectural design for a set of processes implementing an end-to-end application process, the design specifying a process component for each process in the set of processes, each of the process components comprising a modular and application-independent package of reusable granular software implementing a respective and distinct business process, the business process comprising functionality exposed by the process component, and the design further specifying a set of process component interactions based on messages transmitted between two or more of the process components, wherein:
the specified process components include:
a support request processing process component for handling processing of requests to clarify and solve incidents;
a software problem reporting process component for handling collection and reporting of context data;
a service request processing at requester process component for handling logging and resolving of service requests concerning customer issues at an external customer site; and
a service request processing at provider process component for handling logging and resolving of service requests concerning customer issues at an external provider site; and
the process component interactions include interactions between:
the support request processing process component and the software problem reporting process component, where the pair-wise interaction between the support request processing process component and the software problem reporting process component includes the transmission of:
a first type of service request message from the software problem reporting process component to the support request processing process component, the first type of service request message comprising a request for service based on information from a software problem report; and
a first type of service request confirmation message from the support request processing process component to the software problem reporting process component, the first type of service request confirmation message comprising a confirmation of a service request from a service desk;
the software problem reporting process component and the service request processing at provider process component, where the pair-wise interaction between the software problem reporting process component and the service request processing at provider process component includes the transmission of:
a second type of service request message from the software problem reporting process component to the service request processing at provider process component, the second type of service request message comprising a request for creating or changing a service request document in an external service desk; and
a second type of service request confirmation message from the support request at provider processing process component to the service request processing at requester process component, the second type of service request confirmation message comprising a confirmation associated with a request for creating or changing a service request in an external service desk;
the service request processing at requester process component and the support request processing process component, where the pair-wise interaction between the service request processing at requester process component and the support request processing process component includes the transmission of:
a third type of service request message from the service request processing at requester process component to the support request processing process component, the third type of service request message comprising a request for creation or modification to a service request based on information from a software problem report identified by the external requester; and
a third type of service request confirmation message from the support request processing process component to the service request processing at requester process component, the third type of service request confirmation message comprising a confirmation of a requested creation or modification to the identified service request and the confirmation including information on processing progress of the service request to an external service desk of the requester associated with the identified service request; and
the support request processing process component and the service request processing at provider process component, where the pair-wise interaction between the software problem reporting process component and the service request processing at provider process component includes the transmission of:
a fourth type of service request message from the support request processing process component to the service request processing at provider process component, the fourth type of service request message comprising a request that a service document be processed in an external provider system; and
a fourth type of service request confirmation message from the service request processing at provider process component to the support request processing process component, the fourth type of service request confirmation message comprising a confirmation of the fourth type of service request and an update associated with the processed service document based on data from the corresponding external provider system; and
generating, using the at least one processor on the computer system, a computer software application to perform the set of processes based on the obtained design including the specified process components and the specified process component interactions.

17. The method of claim 16, wherein each process in the set of processes is a business process transforming a defined business input into a defined business outcome.

18. The method of claim 17, wherein obtaining digital data representing the architectural design further comprises editing the design before using the design.

* * * * *